United States Patent
Schweikl

(10) Patent No.: US 10,591,050 B2
(45) Date of Patent: Mar. 17, 2020

(54) TRANSMISSION CONTROL UNIT

(71) Applicant: Bayerische Motoren Werke Aktiengesellschaft, Munich (DE)

(72) Inventor: Johann Schweikl, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 15/995,843

(22) Filed: Jun. 1, 2018

(65) Prior Publication Data
US 2018/0274666 A1    Sep. 27, 2018

Related U.S. Application Data

(63) Continuation of application No. PCT/EP2016/079113, filed on Nov. 29, 2016.

(30) Foreign Application Priority Data

Dec. 2, 2015 (DE) .......................... 10 2015 224 114

(51) Int. Cl.
F16H 61/02 (2006.01)
F16H 59/20 (2006.01)
(Continued)

(52) U.S. Cl.
CPC .............. *F16H 59/20* (2013.01); *F16H 59/18* (2013.01); *F16H 61/0213* (2013.01);
(Continued)

(58) Field of Classification Search
None
See application file for complete search history.

(56) References Cited

U.S. PATENT DOCUMENTS 5,099,720 A * 3/1992 Raue ................... F16H 61/0213
200/61.27
5,911,771 A    6/1999 Reichart et al.
(Continued)

FOREIGN PATENT DOCUMENTS

CN    102416957 A    4/2012
CN    104165218 A    11/2014
(Continued)

OTHER PUBLICATIONS

Chinese-language Office Action issued in counterpart Chinese Application No. 201680069848.7 dated Apr. 22, 2019 with English translation (13 pages).
(Continued)

*Primary Examiner* — Justin Holmes
(74) *Attorney, Agent, or Firm* — Crowell & Moring LLP

(57) ABSTRACT

In a transmission controller for the open-loop and/or closed-loop control of the operation of an automatic or automated manual transmission of a motor vehicle, a shifting strategy of the transmission control unit controls the operation of the transmission in an open-loop and/or closed-loop manner based on driving status data and/or driver intention data. The shifting strategy of the transmission control unit influences a gear change from a current actual gear into a target gear based on available environmental data. In the event of a required down-shift from a current actual gear into a lower target gear, the transmission control unit is configured to take into account available information relating to a traffic light status, in particular relating to a change of a traffic light status of a relevant traffic light.

13 Claims, 2 Drawing Sheets

(51) Int. Cl.
*F16H 61/16* (2006.01)
*F16H 59/18* (2006.01)
*F16H 59/66* (2006.01)
*F16H 59/60* (2006.01)

(52) U.S. Cl.
CPC ....... *F16H 61/16* (2013.01); *F16H 2059/605* (2013.01); *F16H 2059/666* (2013.01); *F16H 2061/163* (2013.01)

(56) References Cited

U.S. PATENT DOCUMENTS

| | | | |
|---|---|---|---|
| 2002/0049116 A1* | 4/2002 | Shiiba | F16H 59/66 477/97 |
| 2010/0030437 A1 | 2/2010 | Kim et al. | |
| 2012/0029776 A1 | 2/2012 | Staudinger et al. | |
| 2012/0078467 A1 | 3/2012 | Schweikl et al. | |
| 2013/0297161 A1* | 11/2013 | Gibson | B60W 20/00 701/54 |
| 2014/0343809 A1 | 11/2014 | Reichler et al. | |

FOREIGN PATENT DOCUMENTS

| | | |
|---|---|---|
| DE | 297 15 230 U1 | 1/1998 |
| DE | 20 2005 013 275 U1 | 1/2006 |
| DE | 10 2011 080 712 A1 | 2/2013 |
| DE | 10 2015 204 122 A1 | 11/2015 |
| EP | 0 766 024 A2 | 4/1997 |
| EP | 2 419 662 B1 | 5/2013 |
| WO | WO 2013/020760 A1 | 2/2013 |

OTHER PUBLICATIONS

International Search Report (PCT/ISA/210) issued in PCT Application No. PCT/EP2016/079113 dated Feb. 20, 2017 with English translation (four (4) pages).

German-language Written Opinion (PCT/ISA/237) issued in PCT/EP2016/079113 dated Feb. 20, 2017 (six (6) pages).

German-language Search Report issued in Application No. 10 2015 224 114.9 dated Sep. 22, 2016 with partial English translation (nineteen (19) pages).

Rieck, "Vehicle-2-X Kommunikation", XII Carrier Meeting, Fraunhofer Fokus, Competence Center ASCT, Apr. 24, 2013, pp. 1-19, Berlin, Germany.

* cited by examiner

TRANSMISSION CONTROL UNIT

CROSS REFERENCE TO RELATED APPLICATIONS

This application is a continuation of PCT International Application No. PCT/EP2016/079113, filed Nov. 29, 2016, which claims priority under 35 U.S.C. § 119 from German Patent Application No. 10 2015 224 114.9, filed Dec. 2, 2015, the entire disclosures of which are herein expressly incorporated by reference.

BACKGROUND AND SUMMARY OF THE INVENTION

The invention relates to a transmission control device for the open-loop and/or closed-loop control of the operation of an automatic or automated manual transmission of a motor vehicle.

In principle, the open-loop and/or closed-loop control of the operation of an automatic or automated manual transmission is carried out in accordance with a prescribed shifting strategy based on driving status data and/or driver intention data. The shifting strategy is usually designed such that it permits a compromise between economical and sporty driving styles.

Furthermore, it is already known from the prior art that the shifting strategy takes available environmental information into account in such a way that a gear shift from a current actual gear into a target gear is influenced by available environmental information.

For instance, EP 2 419 662 B1 discloses a transmission control device for the open-loop and/or closed-loop control of the operation of an automatic or automated manual transmission of a motor vehicle, wherein, in creating the shifting strategy, the transmission control device considers, inter alia, topography data from within a defined distance away from a current position of the vehicle. For example, if an intersection with a red traffic signal is recognized on the basis of the topography data within the defined distance in front of the vehicle, then a driver intention is internally increased by the transmission control device, and a target engine speed for an upshift in traction mode is suspended so that an upshift to traction mode is not carried out until later.

A method is known from DE 10 2011 080 712 A1 for influencing a transmission shifting strategy of a motor vehicle, in which a shifting reaction is determined for an anticipatory driving strategy that is based on topology data. One embodiment provides that, when an intersection with a traffic signal is detected ahead and when a remaining duration of a current traffic signal phase is detected, a shifting reaction that depends upon the light phase and/or the velocity is determined, i.e. the shifting reaction is determined in consideration of the sum of the information about a light-controlled intersection ahead and the calculated remaining duration of the current light phase. For instance, if the duration of a current green phase is known, then it is possible to calculate whether the time remaining in the current green phase is sufficient for the vehicle to pass through the intersection at its current velocity. If this is the case, then upshift maneuvers are carried out at a lower target engine speed; otherwise, upshifts are suppressed as much as possible. A method of this type presupposes knowledge about the remaining duration of the current traffic signal phase, which represents a challenge at this time due to the traffic infrastructure and the data that are available or that need to be obtained.

The problem addressed by the invention is thus that of providing an improved transmission control device for the open-loop and/or closed-loop control of the operation of an automatic or automated motor vehicle that is oriented to driver intention and that identifies the driver intention based on available environmental information, and reacts accordingly.

This problem is solved by a transmission control device for the open-loop and/or closed-loop control of the operation of an automatic or automated manual transmission of a motor vehicle, wherein a shifting strategy of the transmission control device based on driving status data and/or driver intention data provides open-loop and/or closed-loop control of the operation of the transmission. The shifting strategy of the transmission control device influences a gear shift from a current actual gear into a target gear based on available environmental information data, wherein the transmission control device is configured to take into account available information about the status of a traffic signal, in particular about a change of the status of a relevant traffic signal, when a downshift from a current actual gear into a lower target gear is requested.

The invention is based upon the recognition that, particularly in street traffic, many drivers attempt to accelerate the vehicle quickly during a recognized change in traffic signal phase from green to amber by correspondingly depressing the accelerator pedal in order to be able to pass through the intersection before the traffic signal changes to red. If the driver attempts to release the maximum accelerating power of the vehicle by a so-called kick-down actuation, it is possible that downshifts will be triggered by this kick-down, which can result in a brief interruption in traction. This in turn can lead to passing the traffic signal later as a result of the downshift than would have occurred without a downshift.

The transmission control device according to the invention for the open-loop and/or closed-loop control of the operation of an automatic or automated manual transmission of a motor vehicle is distinguished on this basis, wherein a shifting strategy of the transmission control device based on driving status data and/or driver intention data provides open-loop and/or closed-loop control of the operation of the transmission, and wherein the shifting strategy of the transmission control device influences a gear shift from a current actual gear into a target gear based on available environmental information data, wherein the transmission control device is configured to take into account available information about the status of a traffic signal, in particular about an (upcoming) change of the status of a relevant traffic signal, when a downshift from a current actual gear into a lower target gear is requested.

In the simplest form, any traffic signal located in the driving direction can be considered relevant. If it is possible to designate one traffic signal among multiple traffic signals in the driving direction as one that is relevant to the vehicle, then that traffic signal can be classified as relevant. Likewise, a pedestrian crossing signal located in the driving direction can also be defined as relevant, since these typically end their green phase earlier. Thus situations can arise in which the pedestrian crossing signal has already ended its green phase but in which the traffic signal relevant to vehicles is still displaying green. If the driver perceives the change in the pedestrian crossing signal, then he or she can carry out a kick-down actuation of the accelerator pedal optionally at a point before the traffic signal relevant to the vehicle changes to amber in order to be sure to be able to pass the light and the intersection before the light turns red.

In particular, in an advantageous development of the invention, the transmission control unit can be configured to take into account the available information about the status of a traffic signal, in particular about an (upcoming) change of the status of a relevant traffic signal, when a downshift from a current actual gear into a lower target gear is requested and when an accelerator pedal actuation by the driver signals the maintenance of the velocity or an intention to accelerate.

An intention to accelerate can be recognized and/or signaled, for example, when it is determined that the driver is performing or has performed a kick-down actuation of the accelerator pedal after the green phase has ended. Likewise, a downshift request can be made because of a, or the, same kick-down actuation.

Moreover, the transmission control device can be configured to prevent, at least initially, a requested downshift (in particular a downshift requested by the kick-down actuation of the accelerator pedal) when an actuation of the accelerator pedal by the driver signals an intention to maintain the velocity or to accelerate (in particular in a kick-down actuation of the accelerator pedal performed by the driver) and when information is available that the relevant traffic signal is in an amber phase following a green phase (or when considering a pedestrian crossing signal as a relevant traffic signal in a red phase following a green phase). In other words, the transmission control unit can be designed such that, at first, it can prevent a downshift (including multiple downshift) into a lower gear that is requested on the basis of the driving behavior of the driver or other parameters, especially when it is detected that the driver has not braked and/or has even accelerated the vehicle despite an amber phase following a green phase.

To implement the prevention of a downshift, a so-called downshift preventer, which prevents a downshift, can be employed when an upcoming traffic signal situation is recognized and a downshift is requested. The downshift preventer can basically be employed in this case when an upcoming traffic signal situation (regardless of the phase) is detected or only once a relevant signal change is recognized. The downshift preventer can be maintained until the intersection has been passed and/or until a relevant intersection point has been passed.

When there is a recognized (upcoming) traffic signal situation with a green phase, an advantageous embodiment of the invention provides that the transmission control device can be configured to detect continuously whether or not a downshift would be sensible based on the current acceleration requirements if the green phase were to end at the current point in time. If it is determined that a downshift would not be sensible, since it would lead to passing through the intersection "later" than without a downshift, measures can already be taken at this point to prevent a (later) downshift on the basis of an existing downshift request.

Whether a requested downshift should be performed or prevented in view of the rapid arrival at the traffic signal and/or the rapid passing of the intersection depends definitively upon the current velocity and the distance of the particular vehicle from the traffic signal and/or from a defined intersection point. Accordingly, the transmission control device can advantageously be configured to prevent, at least initially, a requested downshift (in particular a downshift requested by the kick-down actuation of the accelerator pedal) as a function of the current velocity and/or distance between the motor vehicle and the relevant traffic signal when an actuation of the accelerator pedal by the driver signals an intention to maintain the velocity or to accelerate (in particular in a kick-down actuation of the accelerator pedal performed by the driver) and when information is available that the relevant traffic signal is in an amber phase following a green phase (or when considering a pedestrian crossing signal as a relevant traffic signal in a red phase following a green phase).

To this end, the transmission control device can be configured in particular to prevent, at least initially, a requested downshift (in particular a downshift requested by the kick-down actuation of the accelerator pedal) in cases where the distance ahead until the traffic signal or an intersection point assigned to this traffic signal (start, end, middle) can be covered more quickly without a downshift than with a downshift when an actuation of the accelerator pedal by the driver signals an intention to maintain the velocity or to accelerate (in particular in a kick-down actuation of the accelerator pedal performed by the driver) and when information is available that the relevant traffic signal is in an amber phase following a green phase (or when considering a pedestrian crossing signal as a relevant traffic signal in a red phase following a green phase).

To be able to make a qualified statement as to whether a requested downshift should be performed or prevented in view of the rapid arrival at the traffic signal and/or the rapid passing of the intersection, it is necessary to know the respective lengths of time (with and without downshifting) before reaching the traffic signal or before reaching a position that depends upon the traffic signal and/or the associated traffic situation (e.g. beginning of the intersection, middle of the intersection, end of the intersection). To this end, the transmission control device can be designed in an advantageous embodiment to proactively calculate a first length of time required to cover the distance before reaching the traffic signal or an intersection point associated with this traffic signal (e.g. beginning, end or middle of the intersection) without downshifting and/or a second length of time required to cover the distance before reaching the traffic signal or an intersection point associated with this traffic signal with a downshift when an actuation of the accelerator pedal by the driver signals an intention to maintain the velocity or to accelerate (in particular in a kick-down actuation of the accelerator pedal performed by the driver) and when information is available that the relevant traffic signal is in an amber phase following a green phase (or when considering a pedestrian crossing signal as a relevant traffic signal in a red phase following a green phase). In this way, relevant environmental information, especially environmental information affecting the possible acceleration behavior, in particular information about vehicles traveling ahead, can be taken into account when calculating the first and/or second lengths of time. This makes sense, for example, when the road slopes or vehicles are traveling ahead, which influence or prevent a possible maximum acceleration (with or without downshifting).

For the sake of completeness, it should also be noted that, similar to the prevention of a requested downshift, requested upshift operations can also be suppressed in instances where the traffic signal or relevant intersection point can be reached more quickly in this way.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
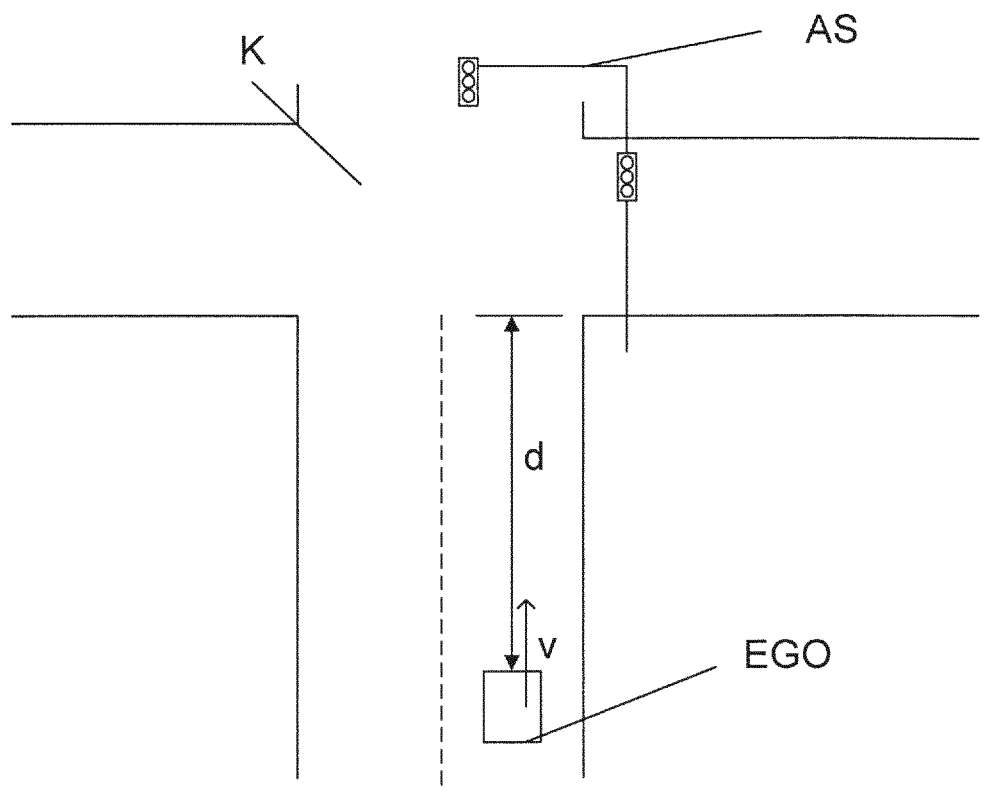
FIG. 1 graphically illustrates a traffic situation in which the subject matter of the invention can come into effect.

FIG. 1 shows in detail a traffic situation with an intersection K, wherein a traffic signal system AS is located in the driving direction of the motor vehicle EGO. The traffic signals of the traffic signal system AS are in an amber phase directly following the green phase. At the point at which the driver of the motor vehicle EGO requests a strong acceleration during the current amber phase, the distance to the beginning of the intersection is value d, and the velocity is value v. According to the invention, as soon as the acceleration request is made for this traffic signal status signal, a decision must be made as to whether a likewise requested downshift should be carried out or prevented in order to reach the beginning of the intersection quickly.

Figure 2:
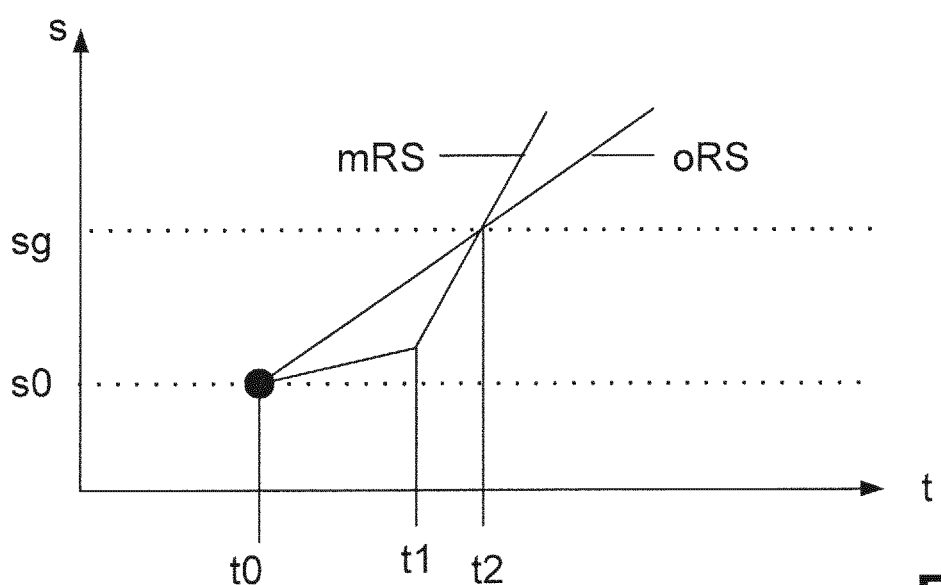
FIG. 2 is a view to demonstrate the distance covered per time period with a downshift and without a downshift.

To this end, FIG. 2 shows a diagram in which the speed at which a distance s can be traversed is plotted over time t after an acceleration request and a simultaneous downshift request (e.g. kick-down actuation of the accelerator pedal) were detected at time t0. At characteristic line oRS, it is assumed that a downshift is not carried out. At characteristic line mRS, it is assumed that a downshift is carried out and is concluded at time t1. Because of the initiated downshift, the slope, i.e. the distance traversed per defined time period until time t1, is very low on characteristic line mRS, since an interruption in traction briefly occurs as a result of the downshift process. Once the downshift process has ended, the slope is significantly greater, since the vehicle can now accelerate more quickly because of the downshift. By contrast, the slope of characteristic line oRS without a downshift, i.e. the distance traversed per defined time period, is greater because of the lack of a downshift in the first time period between t0 and t1 than in characteristic line mRS with a downshift, but it is lower than in characteristic line oRS after time t1.

The intersection point of the two characteristic lines oRS and mRS indicates the limit distance sg at which this limit distance is reached at the same time t2, regardless of whether a downshift is carried out or prevented.

If the distance to be traversed (e.g. up to the traffic signal) is less than the limit distance sg, then the distance s would be traversed more quickly without a downshift. However, if the distance to be traversed s is greater than up to the limit distance sg, then a downshift is required to traverse the distance more quickly.

Figure 3:
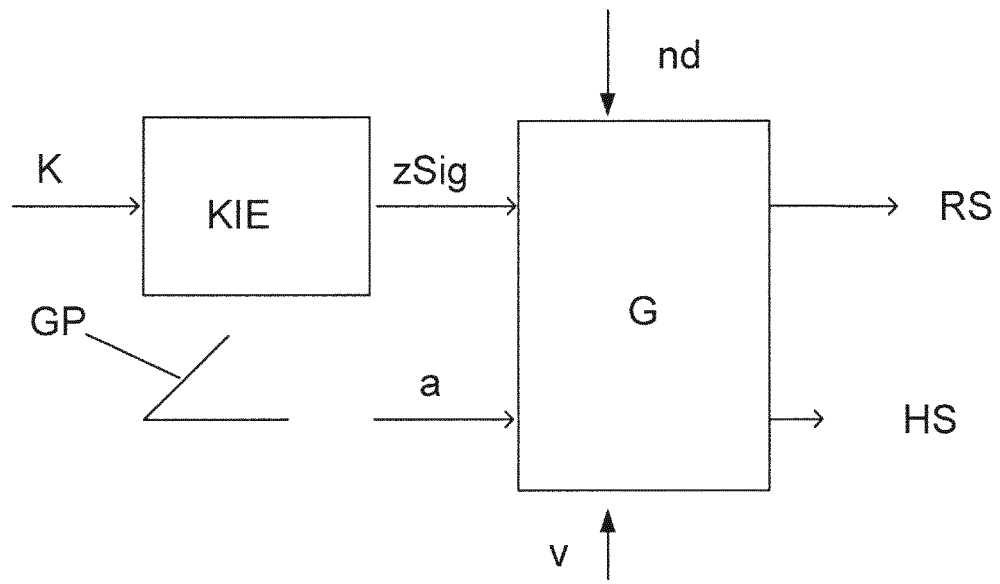
FIG. 3 is a simplified view of a transmission control device according to the invention.

FIG. 3 shows a transmission control device G for the open-loop and/or closed-loop control of the operation of an automatic or automated manual transmission of a motor vehicle, wherein a shifting strategy of the transmission control device based on driving status data and/or driver intention data provides open-loop and/or closed-loop control of the operation of the transmission, and wherein the shifting strategy of the transmission control device influences a gear shift from a current actual gear into a target gear based on available environmental information data. The transmission control unit G receives a signal zSig about the current status of a relevant traffic signal as an input signal from a camera evaluation unit KIE for evaluating the camera data K. Here, a status signal can be a pedestrian crossing signal located in the driving direction and/or the vehicle traffic signal that is relevant to the vehicle. Moreover, the transmission control unit G receives an acceleration signal a requested due to the actuation of the accelerator pedal GP. As an alternative to the acceleration signal a, an accelerator pedal angle of the accelerator pedal GP can also be transmitted to the engine or transmission control unit G. The intention to accelerate a or, rather, the desired wheel torque is then detected within the control unit G. In addition, the transmission control device G receives data nd from a navigation system for determining the vehicle's own position and for determining the position of the traffic signal and/or a relevant intersection point. Alternatively, the information regarding the position of the traffic signal or the relevant intersection point can also come from the camera evaluation unit KIE. The transmission control device G finally receives a velocity signal v, as well.

In response to these input signals zSig, a, nd and/or v, the transmission control device G can exert open-loop and/or closed-loop control over the operation of this transmission by emitting a signal to request a downshift RS or an upshift HS.

Figure 4:
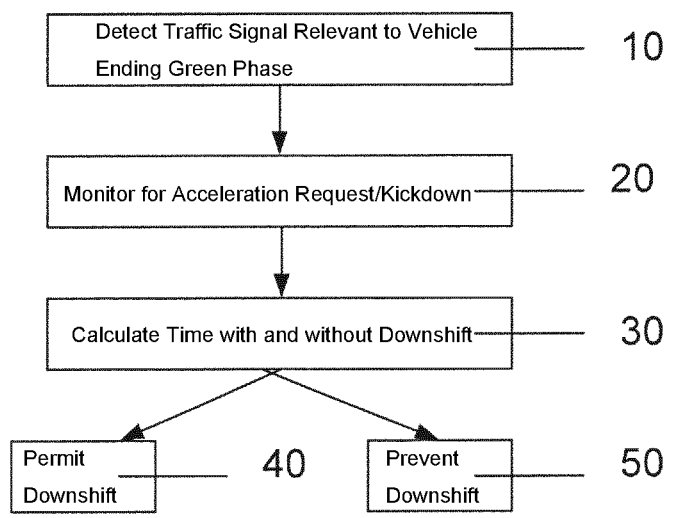
FIG. 4 is a flow chart to represent the open-loop and/or closed loop control of the operation of an automated manual transmission with a transmission control device according to the invention.

FIG. 4 shows one possible variant of how said transmission control device can be configured for an application described above in a sub-function that is relevant to the invention. The function shown here begins in step 10 as soon as it is detected that a traffic signal relevant to the vehicle is ending the green phase. From this point until the traffic signal is reached and/or for a prescribed period of time and/or distance, the route is monitored to determine whether an acceleration request with a request for a downshift, in particular a kick-down actuation of the accelerator pedal, is undertaken by the driver 20. In the next step 30, as soon as a corresponding acceleration request is recognized, the anticipated assumed period of time until the relevant traffic signal or a relevant intersection point is reached is calculated with a downshift and without a downshift, and the process proceeds to step 40 or 50 depending upon the result of a comparison of the two calculated times.

If the period of time before reaching the relevant traffic signal or a relevant intersection point with a downshift is less than the calculated period of time before reaching the relevant traffic signal or a relevant intersection point without a downshift, the process proceeds to step 40, and a requested downshift is permitted. Otherwise, it skips to step 50, and a downshift is prevented so that the relevant position can be reached as quickly as possible.

Alternatively, the evaluation of whether an acceleration request with a request for a downshift is undertaken by the driver and whether it would be sensible to implement or prevent this could also begin during a green light and could calculate continuously ahead of time whether a downshift preventer is applied and/or whether a downshift would have to be suppressed if the traffic signal were to change now. A recognized shift is then only the trigger to activate the previously detected downshift preventer. The downshift preventer would then be applied until the traffic signal is passed, even if the driver may not have requested the downshift at all.

The period of time before the traffic signal (or the relevant intersection position) is reached can be minimized by the invention described here. Especially in an urban setting, it is often not the maximum absolute acceleration (which is usually requested by a kick-down actuation) that is the driver's intention before a traffic light, but rather traversing the traffic signal and/or intersection as quickly as possible. By observing the traffic signal and comparing possible shifting strategies (double downshift, simple downshift, no downshift, . . . ), it is possible to identify the particular strategy that minimizes the time required to reach the traffic signal.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A transmission control device for open-loop and/or closed-loop control of an automatic or automated manual transmission of a motor vehicle, comprising:
    a shifting strategy of the transmission control device based on driving status data and/or driver intention data to provide the open-loop and/or the closed-loop control of operation of the transmission, wherein
    the shifting strategy influences a gear shift from a current actual gear into a target gear based on available information about the motor vehicle's environment, and
    the transmission control device is operatively configured to take into account the available information about the motor vehicle's environment about a change of status of a relevant traffic signal located in a driving direction of the motor vehicle when a downshift from a current actual gear into a lower target gear is requested.

2. The transmission control device as claimed in claim 1, wherein
    the transmission control device is operatively configured to take into account the available information data about the change of the status of the relevant traffic signal when a downshift from a current actual gear into a lower target gear is requested and when an accelerator pedal actuation by a driver signals a maintaining of a velocity or an intention to accelerate the vehicle.

3. The transmission control device as claimed in claim 1, wherein
    the transmission control device is operatively configured to prevent, at least initially, a requested downshift when an actuation of an accelerator pedal by the driver signals an intention to maintain the velocity or to accelerate and when information is available that the relevant traffic signal is in an amber phase following a green phase.

4. The transmission control device as claimed in claim 1, wherein
    the transmission control device is operatively configured to prevent a requested downshift as a function of the current velocity and/or distance between the motor vehicle and the relevant traffic signal when an actuation of an accelerator pedal by the driver signals an intention to maintain the velocity or to accelerate and when information is available that the relevant traffic signal is in an amber phase following a green phase.

5. The transmission control device as claimed in claim 1, wherein
    the transmission control device is operatively configured to prevent a requested downshift in cases where the distance ahead until the relevant traffic signal or an intersection point assigned to said traffic signal can be covered in less time without a downshift than with a downshift when an actuation of an accelerator pedal by the driver signals an intention to maintain the velocity or to accelerate and when information is available that the relevant traffic signal is in an amber phase following a green phase.

6. The transmission control device as claimed in claim 1, wherein
    the transmission control device proactively calculates a first length of time required to cover the distance before reaching the relevant traffic signal or an intersection point associated with the relevant traffic signal without downshifting and/or a second length of time required to cover the distance before reaching the relevant traffic signal or an intersection point associated with the relevant traffic signal with a downshift when an actuation of the accelerator pedal by the driver signals an intention to maintain the velocity or to accelerate and when information is available that the relevant traffic signal is in an amber phase following a green phase.

7. The transmission control device as claimed in claim 6, wherein
    the information about the motor vehicle's environment is taken into account when calculating the first and/or second lengths of time.

8. The transmission control device as claimed in claim 7, wherein
    the information about the motor vehicle's environment comprises information affecting possible acceleration behavior of the vehicle.

9. The transmission control device as claimed in claim 8, wherein
    the information about the motor vehicle's environment affecting possible acceleration behavior comprises information about vehicles traveling ahead of the vehicle.

10. The transmission control device as claimed in claim 2, wherein
    a kick-down actuation of the accelerator pedal signals an intention to accelerate.

11. The transmission control device as claimed in claim 1, wherein
    a downshift is requested by a kick-down actuation of an accelerator pedal.

12. The transmission control device as claimed in claim 1, wherein
    a pedestrian crossing signal present in a driving direction is identified as the relevant traffic signal.

13. A method of operating an automatic or automated manual transmission of a motor vehicle having a transmission control device that employs a shifting strategy based on driving status data and/or driver intention data, the method comprising the acts of:
    detecting a change of status of a relevant traffic signal with respect to a driving direction of the motor vehicle;
    when the change of status of the relevant traffic signal is detected, determining whether an acceleration request with a request for a downshift is undertaken by a driver of the motor vehicle;
    as soon as the acceleration request is determined, calculating an anticipated period of time until the relevant traffic signal is reached both with a downshift and without a downshift; and
    when the calculated period of time before reaching the relevant traffic signal with a downshift is less than the calculated period of time before reaching the relevant traffic signal without the downshift, then permitting the requested downshift, otherwise preventing the requested downshift.

* * * * *